United States Patent
Wang et al.

(10) Patent No.: US 12,424,358 B2
(45) Date of Patent: *Sep. 23, 2025

(54) IRON-NITRIDE MAGNET BY NITRIDING A POROUS STRUCTURE

(71) Applicant: REGENTS OF THE UNIVERSITY OF MINNESOTA, Minneapolis, MN (US)

(72) Inventors: Jian-Ping Wang, Shoreview, MN (US); Jinming Liu, Minneapolis, MN (US); Bin Ma, Roseville, MN (US); Fan Zhang, Minneapolis, MN (US); Guannan Guo, Minneapolis, MN (US); Yiming Wu, Shoreview, MN (US); Xiaowei Zhang, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,020

(22) Filed: May 15, 2024

(65) Prior Publication Data

US 2024/0363269 A1    Oct. 31, 2024

Related U.S. Application Data

(63) Continuation of application No. 17/058,882, filed as application No. PCT/US2019/034178 on May 28, 2019, now Pat. No. 12,014,853.

(60) Provisional application No. 62/677,095, filed on May 28, 2018.

(51) Int. Cl.
| | |
|---|---|
| H01F 1/04 | (2006.01) |
| C01B 21/06 | (2006.01) |
| C23C 8/02 | (2006.01) |
| C23C 8/26 | (2006.01) |
| H01F 1/047 | (2006.01) |
| H01F 41/02 | (2006.01) |

(52) U.S. Cl.
CPC ......... *H01F 1/047* (2013.01); *C01B 21/0622* (2013.01); *C23C 8/02* (2013.01); *C23C 8/26* (2013.01); *H01F 41/0253* (2013.01); *C01P 2002/60* (2013.01); *C01P 2002/72* (2013.01); *C01P 2002/77* (2013.01); *C01P 2004/02* (2013.01); *C01P 2004/03* (2013.01); *C01P 2004/04* (2013.01); *C01P 2006/42* (2013.01)

(58) Field of Classification Search
CPC ... H01F 41/0253; H01F 1/047; C01P 2006/42
See application file for complete search history.

(56) References Cited

U.S. PATENT DOCUMENTS

| | | | |
|---|---|---|---|
| 12,014,853 B2* | 6/2024 | Wang | ....................... C23C 8/26 |
| 2017/0226635 A1 | 8/2017 | Wang et al. | |
| 2017/0330660 A1 | 11/2017 | Wang et al. | |

FOREIGN PATENT DOCUMENTS

WO    2015/193295 A1    12/2015

OTHER PUBLICATIONS

Naganuma et al., "Magnetic and electrical properties of iron nitride films containing both amorphous matrices and nanocrystalline grains" Science and Technology of Advanced Materials, 2004, vol. 5, p. 101-106; p. 101, abstract.
Schwarz et al., "Pore Formation Upon Nitriding Iron and Iron-Based Alloys: The Role of Alloying Elements and Grain Boundaries", Metallurgical and Materials Transactions A., Oct. 3, 2014, vol. 45, p. 6173-6186; p. 6176, left col, para 2-4, right col, para 1, p. 6179, left col, para 2, right col, para 2, p. 6180, Table V, left col, para 1, p. 6184, left col, para 2.

* cited by examiner

*Primary Examiner* — Jessee R Roe
(74) *Attorney, Agent, or Firm* — BakerHostetler

(57) ABSTRACT

In general, the disclosure is directed to bulk iron-nitride materials having a polycrystalline microstructure having pores including a plurality of crystallographic grains surrounded by grain boundaries, where at least one crystallographic grain includes an iron-nitride phase including any of a body centered cubic (bcc) structure, a body centered tetragonal (bct), and a martensite structure. The disclosure further describes techniques producing a bulk iron-nitride material having a polycrystalline microstructure, including: melting an iron source to obtain a molten iron source; fast belt casting the molten iron source to obtain a cast iron source; cooling and shaping the cast iron source to obtain a bulk iron-containing material having a body-centered cubic (bcc) structure; annealing the bulk iron-containing material at an austenite transformation temperature and subsequently cooling the bulk iron-containing material; and nitriding the bulk iron-containing material to obtain the bulk iron-nitride material.

24 Claims, 11 Drawing Sheets

IRON-NITRIDE MAGNET BY NITRIDING A POROUS STRUCTURE

CROSS-REFERENCE TO RELATED APPLICATIONS

This application is a continuation of U.S. patent application Ser. No. 17/058,882, filed Nov. 25, 2020, now U.S. Pat. No. 12,014,853, which is a National Stage of International Patent Application No. PCT/US2019/034178, filed May 28, 2019, and claims the benefit of U.S. Provisional Patent Application No. 62/677,095, filed May 28, 2018, the entire contents of which are incorporated herein by reference for all purposes.

GOVERNMENT INTEREST

This invention was made with Government support under DE-AR0000199 awarded by the United States Department of Energy, Office of ARPA-E. The Government has certain rights in this invention.

TECHNICAL FIELD

The disclosure relates to bulk magnets having a polycrystalline microstructure and techniques producing bulk magnets having a polycrystalline microstructure.

BACKGROUND OF THE INVENTION

Permanent magnets (PMs) are widely used in clean and renewable energy industry such as electric motors and wind turbines. Rare-earth PMs such as Nd—Fe—B, $SmCo_5$, and $Sm_2Co_{17}$, are highly demanded since they have large magnetocrystalline anisotropy suitable for high energy products. However, due to the supply constraint and cost issues of rare-earth elements, research on rare-earth-free PMs has gained much more attention. $\alpha''$—$Fe_{16}N_2$ has been known as a ferrromagentic material with high magnetic saturation ($M_s$) and large magnetocrystalline anisotropy. Meanwhile, both Fe and N are abundant in nature and much cheaper than rare-earth elements. Therefore, $\alpha''$—$Fe_{16}N_2$ is a very promising candidate for rare-earth-free PMs. $\alpha''$—$Fe_{16}N_2$ has been known since 1950s. The magnetic properties of $\alpha''$—$Fe_{16}N_2$ thin film has been studied, showing the magnetic saturation ($M_s$) of $\alpha''$—$Fe_{16}N_2$ exceeding that of FeCo alloy. Besides the thin film studies, many research groups have also investigated powders and foils, which could be used for PMs. In order to obtain $\alpha''$—$Fe_{16}N_2$, nitriding is applied to Fe. The Fe-nitriding is usually carried out at a high temperature above 590° C. with ammonia and hydrogen gas to form γ-FeN, followed by quenching the γ-FeN to form $\alpha'$—$Fe_8N$. $\alpha''$—$Fe_{16}N_2$ is obtained by annealing of the $\alpha'$—$Fe_8N$ at a temperature below 200° C. However, this high temperature nitriding process produces an $\alpha''$—$Fe_{16}N_2$ ratio less than 50%. In late 1990s, low temperature nitriding below 200° C. was used to directly prepare $\alpha''$—$Fe_{16}N_2$ with 20 nm α-Fe nanoparticles as raw material. Single phase $\alpha''$—$Fe_{16}N_2$ was reported later by this low temperature nitriding approach. However, only nanoparticles could be used for such low temperature nitriding.

Many bulk metallic materials are produced initially as castings which are then further processed in the solid state by forging, rolling, extrusion, etc. to intermediate or final products. These procedures, which may be carried out hot or cold, and which may involve intermediate anneals, are collectively termed thermomechanical processing. Recovery, recrystallization and grain growth are elements of this thermomechanical processing. For commercialization of iron-nitride materials, bulk iron-nitride materials are much needed. However, the necessary thermomechanical processing has not been known.

BRIEF SUMMARY OF THE INVENTION

In general, the disclosure describes exemplary bulk iron-nitride materials having a polycrystalline microstructure including a plurality of crystallographic grains surrounded by grain boundaries, where at least one crystallographic grain includes an iron-nitride phase including any of a body centered cubic (bcc) structure, a body centered tetragonal (bct) structure and a martensite structure, where the microstructure comprises pores.

In one example, the disclosure is directed to a bulk iron-nitride material including an $\alpha''$—$Fe_{16}N_2$ phase.

In another example, the disclosure is directed to a bulk iron-nitride material having a polycrystalline microstructure including a plurality of crystallographic grains an average grain size of which is about 10 µm or less.

In another example, the disclosure is directed to a bulk iron-nitride material having a polycrystalline microstructure including a plurality of crystallographic grains surrounded by grain boundaries at least one of which has a width of about 50 nm or less.

In another example, the disclosure is directed to a bulk iron-nitride material having a polycrystalline microstructure including grain boundaries at least one of which includes a non-magnetic element selected from the group consisting of Al, Cu, Ti, W, Mn, Cr, Zr, Ta, Nb, B, C, Ni, Ru, $SiO_2$, $Al_2O_3$, $Ta_{(x)}O_{(y)}$, CrO, $Cr_2O_3$, $TiO_2$, BN, $Si_{(x)}N_{(y)}$, $AL_{(x)}N_{(y)}$, $Cr_xN_y$, $Mn_xN_y$ or combinations thereof, wherein each of x and y is larger than 0 and less than 1.

In another example, the disclosure is directed to a bulk iron-nitride material having a phase ratio of $Fe_{16}N_2$/(non-$Fe_{16}N_2$) Fe phases of about 1.0 or higher.

In another example, the disclosure is directed to a bulk iron-nitride material having a saturation magnetization of 130 emu/g or higher.

In another example, the disclosure is directed to a bulk iron-nitride material having a coercivity of 1000 Oe or higher.

The disclosure also describes exemplary techniques producing a bulk iron-nitride material having a polycrystalline microstructure, including at least some of: melting an iron source to obtain a molten iron source; fast belt casting the molten iron source to obtain a cast iron source; cooling and shaping the cast iron source to obtain a bulk iron-containing material having a body-centered cubic (bcc) structure; annealing the bulk iron-containing material at an austenite transformation temperature and subsequently cooling the bulk iron-containing material; reducing the bulk iron-containing material in hydrogen; and nitriding the bulk iron-containing material to obtain the bulk iron-nitride material.

In another example, the disclosure is directed to form an iron-nitride material directly using a porous structure of any of iron based ribbon, foil and foam with an large interior surface area.

BRIEF DESCRIPTION OF THE SEVERAL VIEW OF THE DRAWINGS

FIG. 1 describes an exemplary method 100 for preparing a bulk iron-nitride material according to the disclosure.

FIG. 3(c)-(f) show micrographs taken at various magnifications after nitriding at 160° C. with 80 sccm ammonia.

Figure 4:
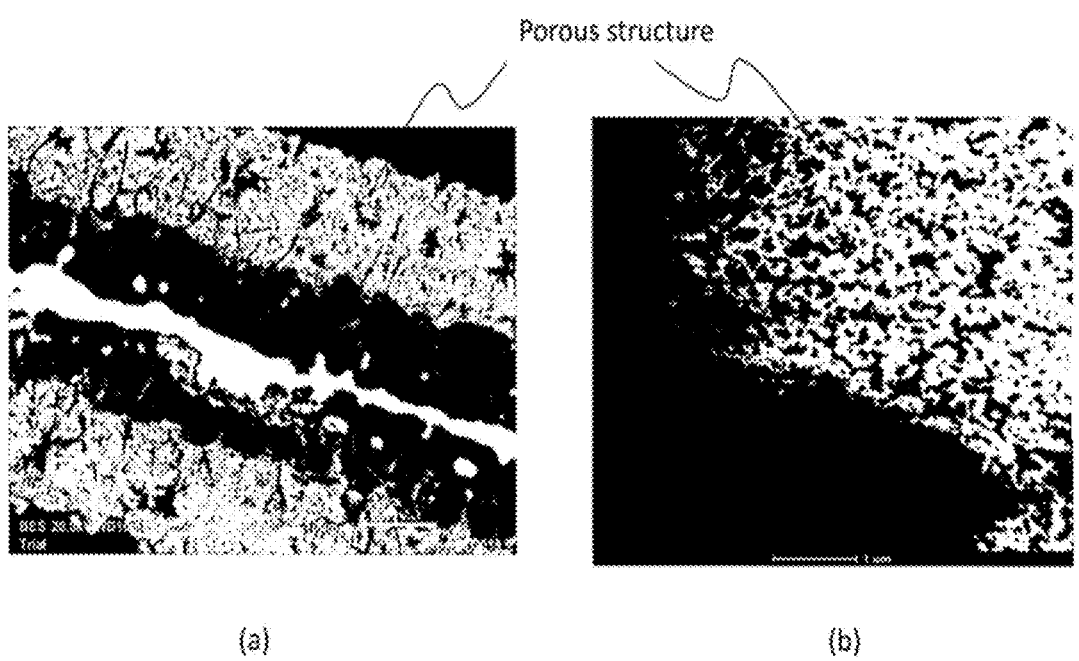

FIG. 4 shows (a) cross-sectional SEM (Scanning Electron Microscope) images, (b) STEM (Scanning Transmission Electron Microscope) images showing a porous structure of the bulk iron-nitride after the nitriding.

Figure 5:
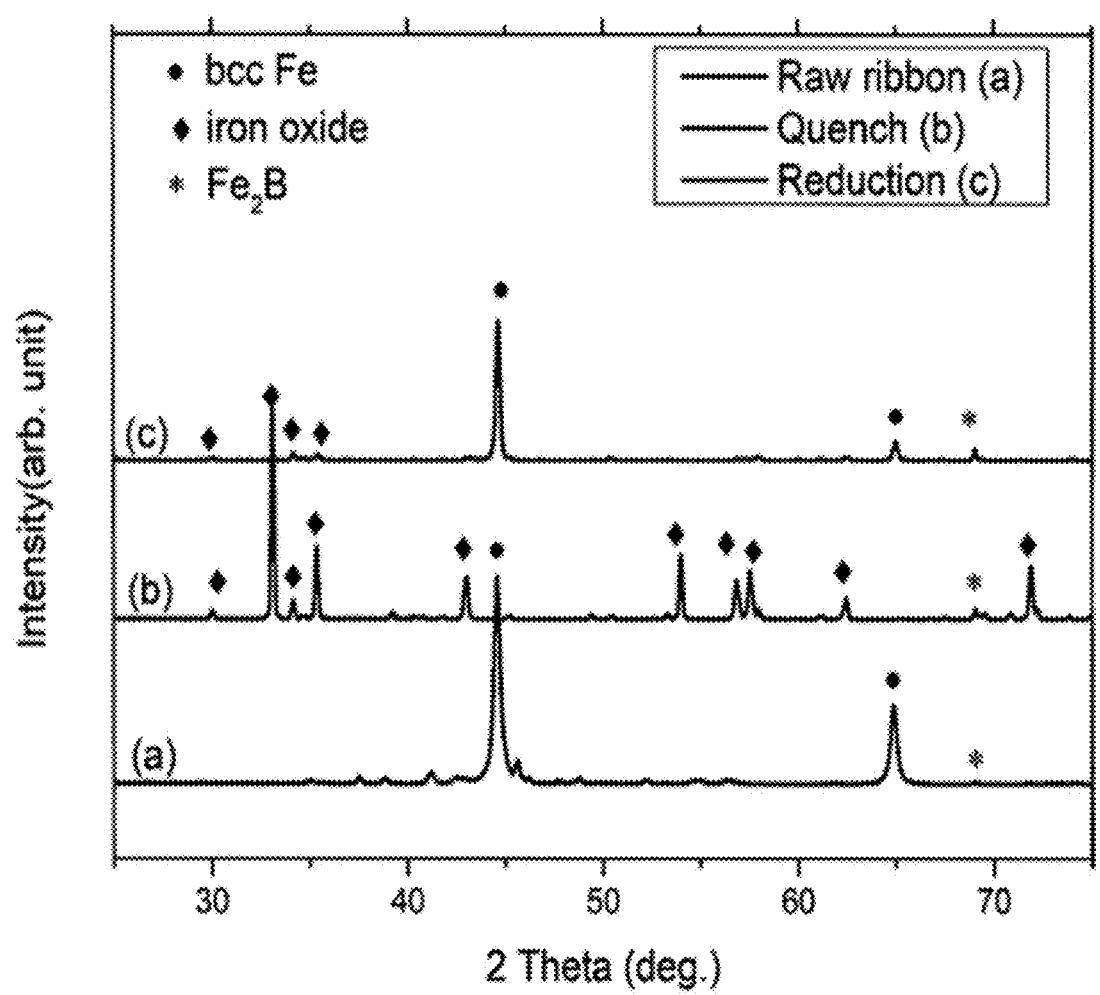

FIG. 5 shows XRD patterns of (a) raw ribbon; (b) ribbon quenched after recrystallization at 930° C.; (c) ribbon after reducing in hydrogen.

Figure 6:
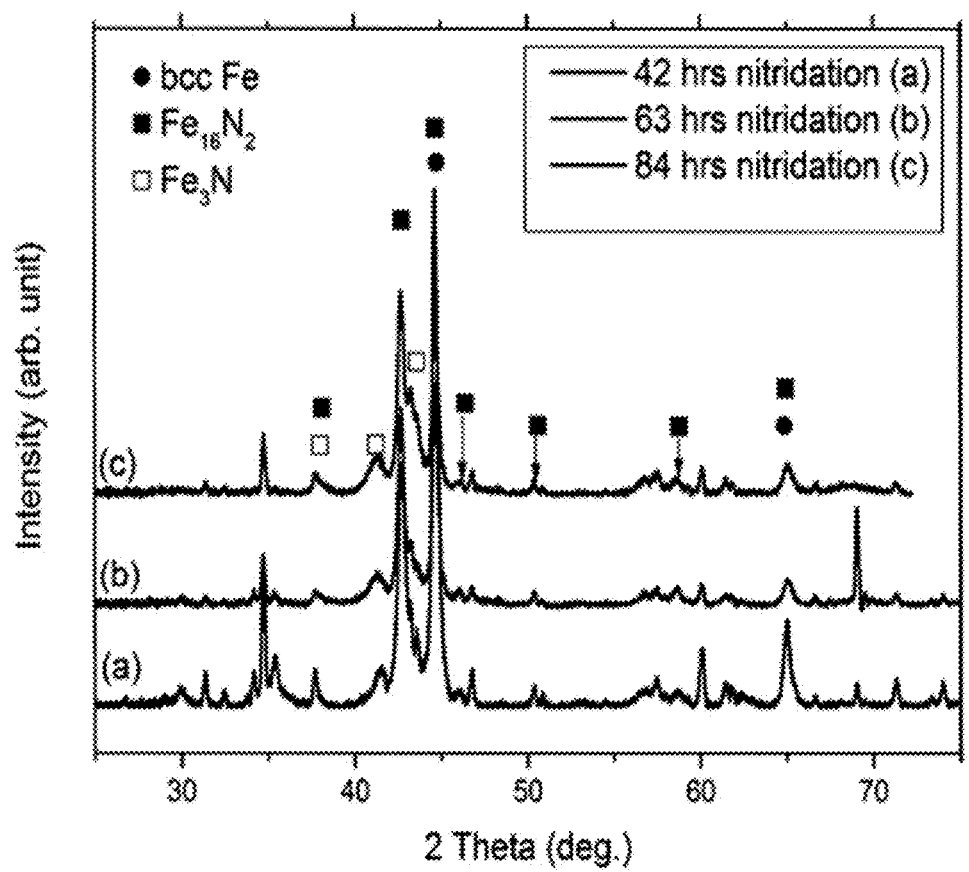

FIG. 6 shows XRD patterns of ribbons with different nitriding conditions: (a) 160° C. with 80 sccm ammonia for 42 h; (b) 160° C. with 80 sccm ammonia for 63 h; (c) 160° C. with 80 sccm ammonia for 84 h.

Figure 7:
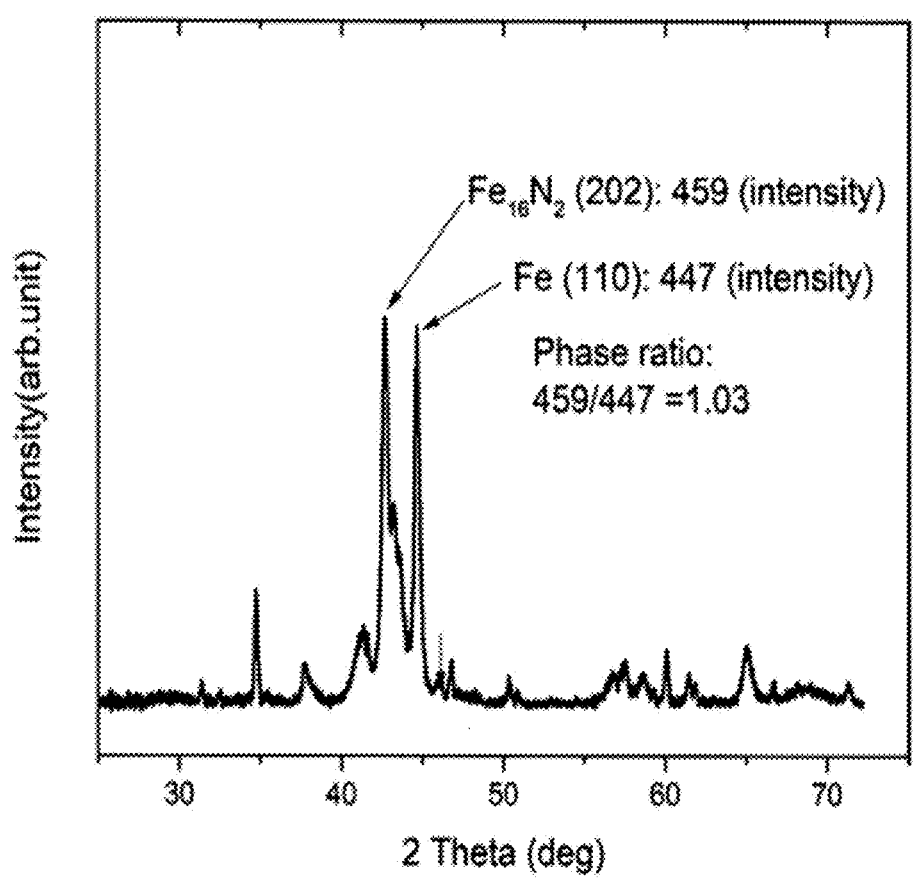

FIG. 7 shows a $Fe_{16}N_2$ phase ratio of an exemplary sample.

Figure 8:
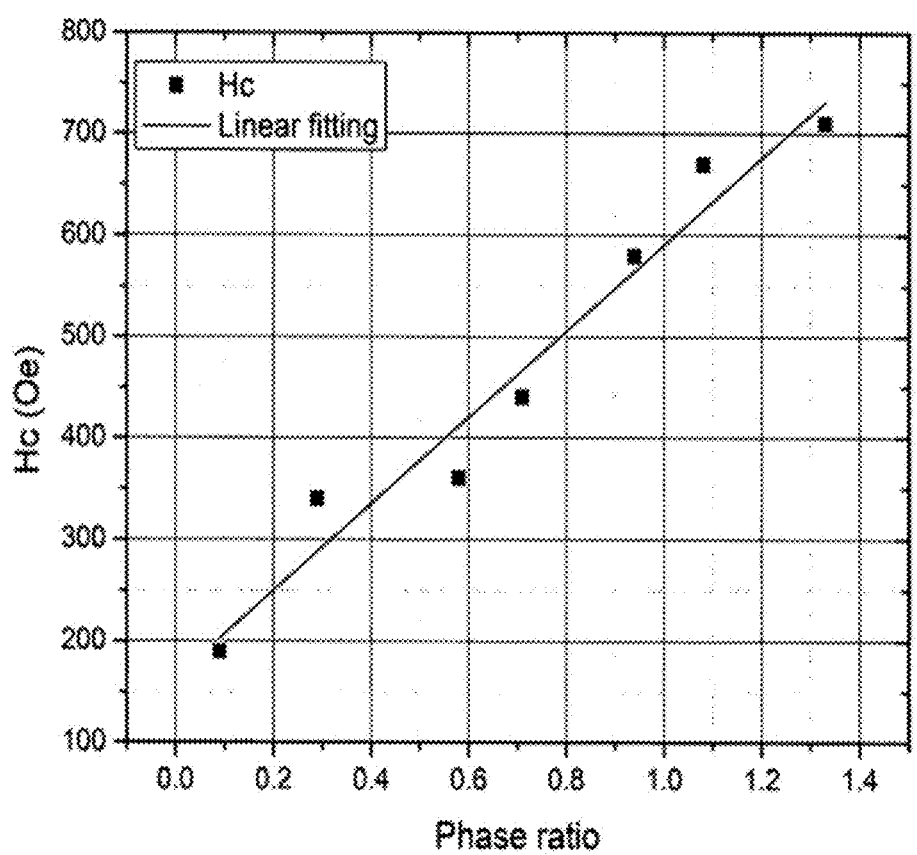

FIG. 8 shows coercivity as a function of relative $Fe_{16}N_2$ phase ratio.

Figure 9:
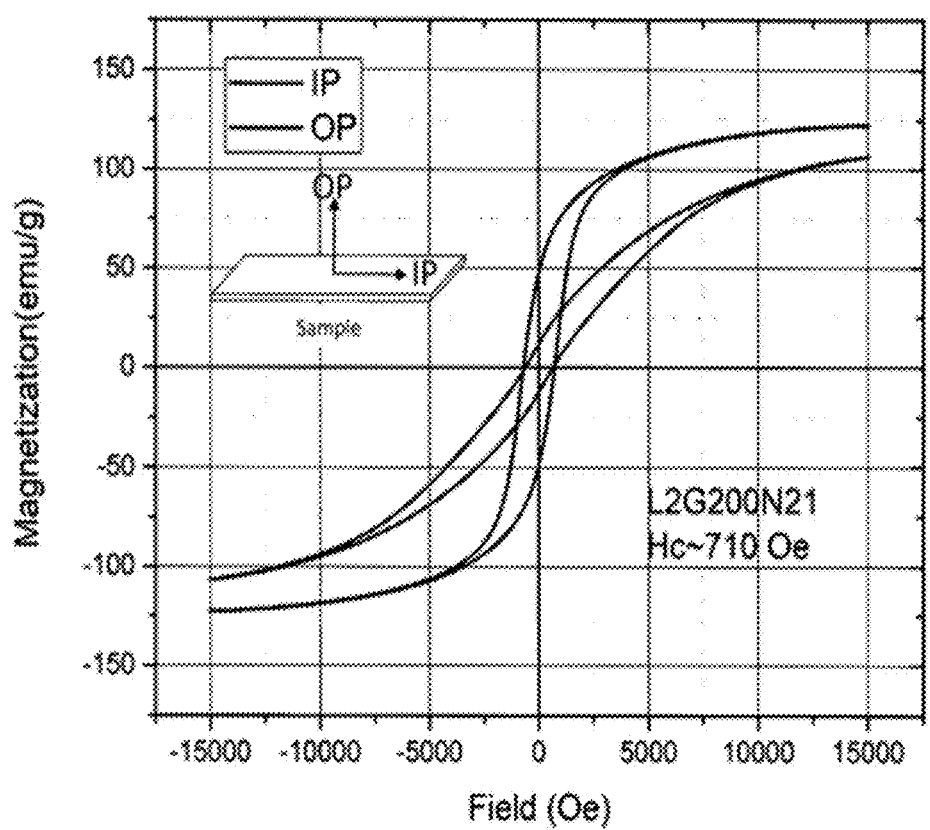

FIG. 9 shows hysteresis loops of an exemplary sample with a $Fe_{16}N_2$ ratio of about 1.3 shown in FIG. 8.

Figure 10:
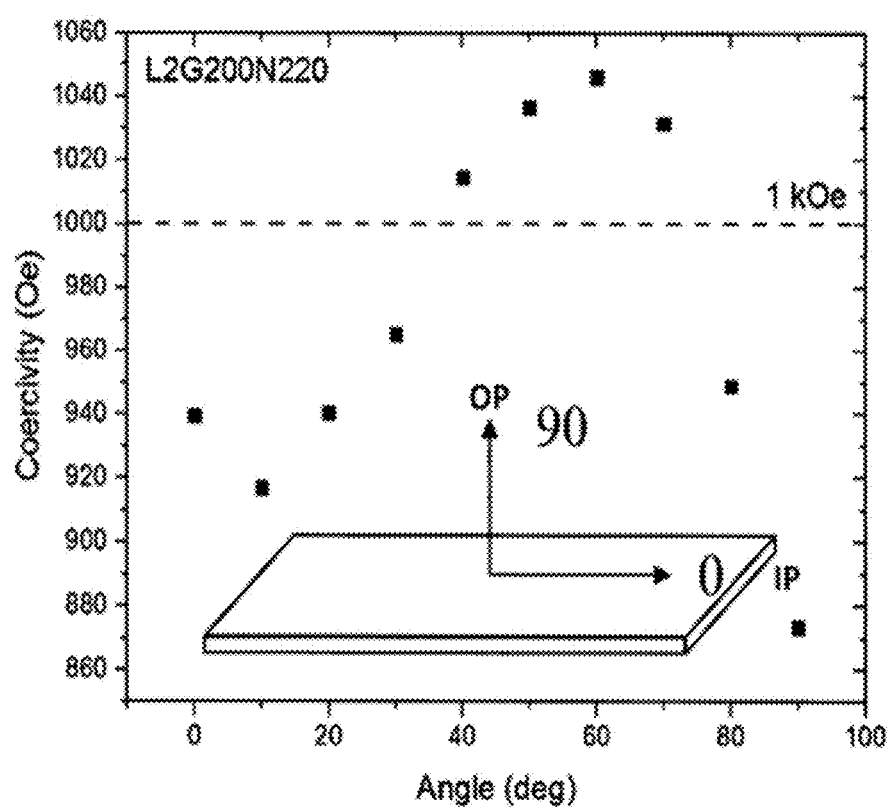

FIG. 10 shows an angular dependence of coercivity with respect to the sample orientation.

Figure 11:
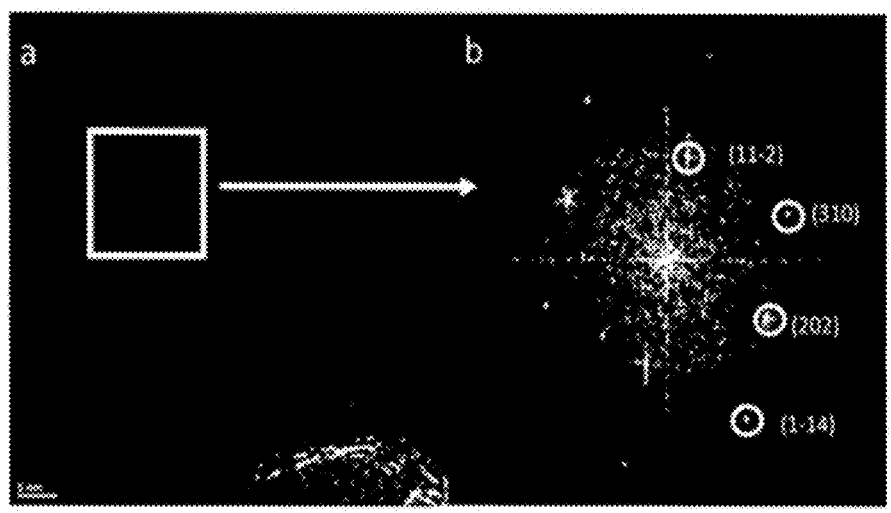

FIG. 11 shows (a) high resolution transmission electron microscope image of nitride ribbon sample, and (b) diffraction patterns of a region in the white box of (a). The patterns matches with the $Fe_{16}N_2$ diffraction pattern with the zone axis

DETAILED DESCRIPTION OF THE INVENTION

The disclosure describes permanent magnets that include $Fe_{16}N_2$ phase and techniques for forming permanent magnets that include a $Fe_{16}N_2$ phase. In some examples, some crystallographic grains may include a $Fe_{16}N_2$ phase. In other examples, the $Fe_{16}N_2$ phase may be present in combination of other phases such as phases of magnetically soft material, vacancies or pores produced by oxidation and reduction process. Through this disclosure, the terms $Fe_{16}N_2$, $\alpha''$—$Fe_{16}N_2$, $\alpha''$—$Fe_{16}N_2$ phase, $\alpha''$—$Fe_{16}N_2$ phase domain, for example, may be used interchangeably to refer to an $\alpha''$—$Fe_{16}N_2$ phase within a material.

Magnets that include a $Fe_{16}N_2$ phase may provide a relatively high energy product, for example, as high as about 134 MGOe when the $Fe_{16}N_2$ permanent magnet is anisotropic. The energy product of a permanent magnet is proportional to the product of coercivity and remanent magnetization. For comparison, the energy product of $Nd_2Fe_{14}B$ permanent magnet may be as high as about 60 MGOe.

A higher energy product can lead to increased efficiency of a permanent magnet when used in motors, generators, or the like. Additionally, permanent magnets that include a $Fe_{16}N_2$ phase may not include rare earth element, which may reduce an environmental impact of producing the magnets.

The present disclosure may be understood more readily by reference to the following detailed description taken in connection with the accompanying figures and examples, which form a part of this disclosure. It is to be understood that this disclosure is not limited to the specific devices, methods, applications, conditions, or parameters described and/or shown herein, and that the terminology used herein is for the purpose of describing particular examples and is not intended to be limiting of the claims. When a range of values is expressed, another example includes from the one particular value and/or to the other particular value. Similarly, when values are expressed as approximations, by use of the antecedent "about," it will be understood that the particular value forms another example. All ranges are inclusive and combinable. Further, a reference to values stated in a range includes each and every value within that range.

It is to be appreciated that certain features of the disclosure which are, for clarity, described herein in the context of separate examples, may also be provided in combination in a single example. Conversely, various features of the disclosure that are, for brevity, described in the context of a single example, may also be provided separately or in any subcombination.

Materials according to the disclosure have a polycrystalline microstructure including a plurality of grains. The term "grains" refers to discrete microstructural domains defined by boundaries, for example, grains defined by grain boundaries where each grain is seen to be separated by its neighbors by dark lines (grain boundaries) in a micrograph of an etched sample. The term "grains" may also include particles or crystallites to include compositional phases thereof. Grain boundaries include interface boundaries between singe-phase grains and interphase boundaries between grains of different phases.

According to the disclosure, a plurality of grains in an iron-nitride material include grains having an iron-containing phase.

The magnetic interaction between adjacent ferromagnetic grains may reduce the coercive field of the magnet. It is important to control the grain size and the grain boundary composition to obtain the maximum coercive field, hence maximum energy product. The size of ferromagnetic grains can be controlled by thermo-mechanical processing of the iron-containing materials. Controlling the grain boundary composition can also be considered to obtain a high energy product magnet. The size of ferromagnetic grains can be controlled by using a doping element that controls the grain growth by precipitating along the grain boundaries. The grains of ferromagnetic FeN can be decoupled using a non-magnetic grain boundary composition. Non-magnetic precipitation can be utilized to decouple the ferromagnetic grains.

The disclosure describes exemplary materials having a plurality of grains. The disclosure also describes exemplary techniques for preparing the exemplary materials. In general, the disclosure is directed to bulk iron-nitride materials that include a $Fe_{16}N_2$ phase and techniques for forming the bulk iron-nitride materials. In particular, the techniques described herein are used to form bulk $Fe_{16}N_2$ permanent magnets with a polycrystalline microstructure.

Figure 1:
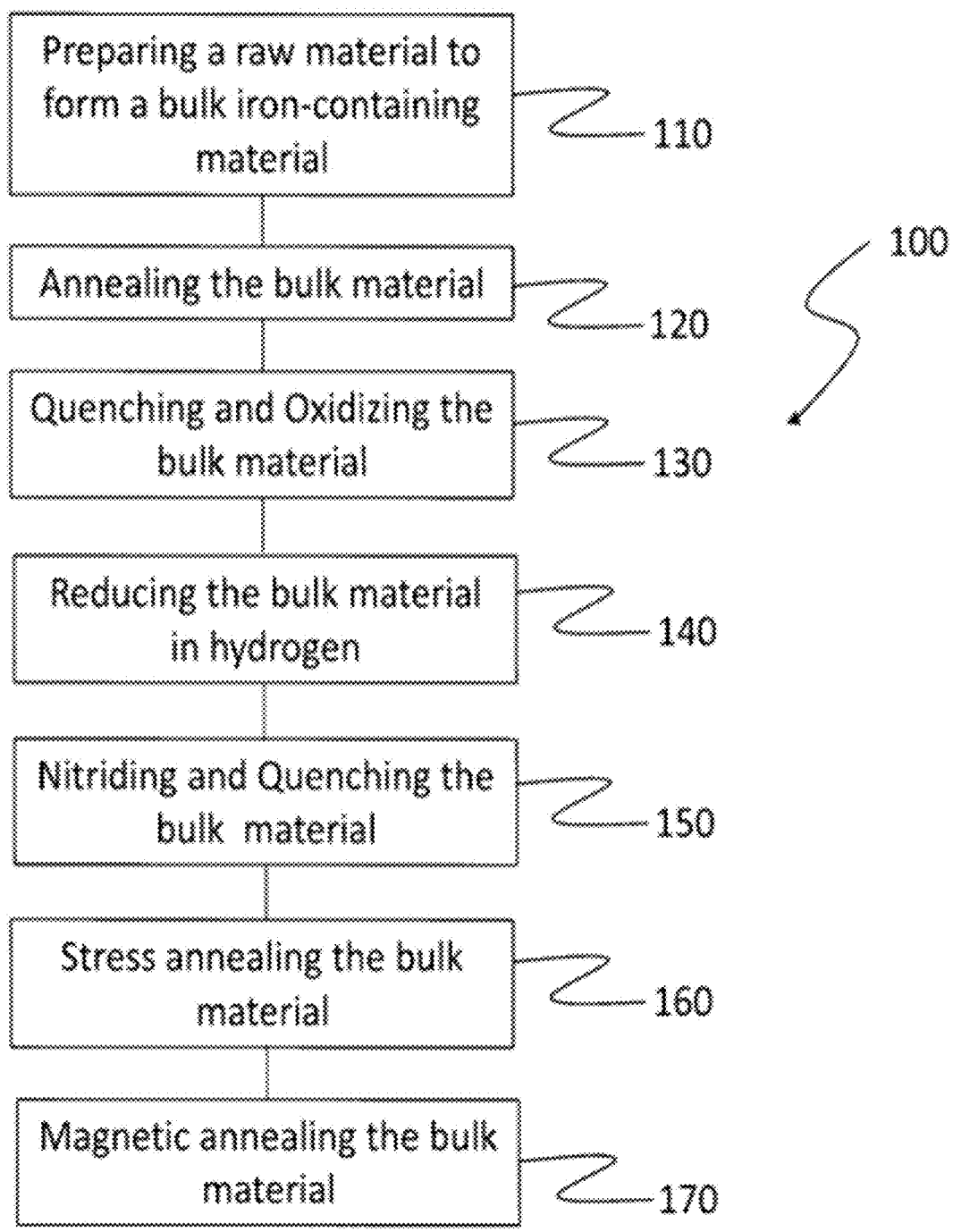

FIG. 1 describes an exemplary method 100 for preparing a bulk iron-nitride material having a polycrystalline microstructure including a plurality of grains that include an iron-nitride phase. In some examples, the method 100 may include preparing a raw material 110 to form a bulk iron-containing material and subsequently annealing 120, and nitriding the material 150. In other examples, the method 100 may include at least some combinations of preparing a raw material 110, annealing 120, oxidizing 130, reducing in hydrogen 140, nitriding 150, stress annealing 160, and magnetic field annealing 170 the material.

Materials according to the disclosure have a polycrystalline microstructure including a plurality of grains. A grain boundary/boundaries are formed by spatial arrangements of dislocations in periodic atomic arrangement between two adjacent grains. Grain boundaries define the respective shapes and respective dimensions of grains. For example, grain boundaries may define substantially spherical, ellipsoidal, cuboidal, polygonal, or any other closed shapes of grains.

In general, a size of a grain can be measured with the diameter of a spherical grain or the cube root of the calculated volume of a non-spherical grain. In some examples, the shape of grains may define major dimensions of grains. For substantially spherical grains, the major dimension may be defined by a diameter. For substantially ellipsoidal grains, the major dimension may be defined by a major elliptical axis. For grains having an arbitrary grain boundary, the major dimension may be defined by the maximum separation between opposing portions of grain boundaries across the grains. For a grain that is symmetric or exhibits symmetry about an axis, a grain size of the grain may refer to the major dimension of the grain. For a grain that is irregular or asymmetric, a grain size of a grain refers to the average of all diameters of the grain, each diameter being a line passing through the geometric center of the grain. An average grain size is in general measured in accordance with ASTM (American Standard Test Method) E112-13, which describes standard test methods for determining average grain size.

A grain boundary angle is in general determined by a crystallographic misorientation between two adjacent grains across the grain boundary. It is convenient to divide grain boundaries into those whose misorientation is greater than a certain angle, high angle grain boundaries (HAGB), and those whose misorientation is less than the certain angle, low angle grain boundaries (LAGB). The angle at which the transition from low to high angle boundaries occurs is typically taken as between 10° and 15°. The sub-grain boundaries among the sub-grains have, in general, a misorientation angle of less than about 10°-15° whereas most of grain boundaries have a high misorientation angle of about 10°-15° or higher.

According to the disclosure, grains including the iron-containing phase may have an average grain size of about 10 µm or less. In some examples, the average grain size may be about 5 µm or less. In some examples, the average grain size may be about 1 µm or less. In some examples, the average grain size may be in the range of from about 10 nm to about 10 µm. In some examples, the average grain size may be in the range of from about 20 nm to about 10 µm. In some examples, the average grain size may be in the range of from about 50 nm to about 10 µm. In some examples, the average grain size may be about 200 nm or less. In other examples, the average grain size may be 100 nm or less.

In preparing a raw material 110, the raw material includes iron. In some examples, the raw material may include any of B and Cu. Boron (B) is a doping element to control the microstructure and crystal structure of magnets. Copper (Cu) is another element used because of its insoluble nature in Fe. Cu is lowly soluble in α-Fe below 600° C., which makes Cu a great choice for phase segregation. Cu atoms cluster to form a precipitate along the grain boundary and help in grain boundary engineering in decoupling of ferromagnetic FeN grains by non-magnetic Cu precipitates along the grain boundary and hindering the grain growth with the Cu precipitates along the grain boundaries.

The raw material is processed to form a bulk iron-containing material 110. For example, the raw material may be processed to form a bulk iron-containing material having a polycrystalline structure in a form of any of strip, ribbon, foil, sheet, foam or plate 110. The bulk iron-containing material may have a body centered cubic (bcc) structure. Forming a bulk iron-containing material may be carried out by various methods.

In some examples, an iron based porous structure may be prepared with powder metallurgy such as iron/iron oxide composite and/or iron foam prepared by electro-deposition/hydrogen reduction method. In powder metallurgy, the iron or iron-based powder with additional alloy element can be produced ahead of high temperature or high pressure sintering. In iron/iron oxide composite, fine iron and iron oxide powders are compacted together using a hydraulic compressor. After the compaction, the compacted sample is reduced by $H_2$ at a certain temperature to reduce the iron oxide. Iron oxide after reduction produces a porous structure. In another example, with an iron foam prepared by electro-deposition/hydrogen, a bulk material with controllable porosity can be obtained. In some examples, fine iron and iron oxide powders may be compacted together to form an iron and iron oxide sheet. The iron and iron oxide sheet is reduced by hydrogen at a certain temperature to reduce iron oxide in the sheet. After reduction, an iron sheet with a porous structure may be obtained.

In other examples, the raw material may be processed with fast belt casting. For example, an iron-containing ribbon may be prepared with a melt spinning technique. In melting spinning, an iron precursor or iron-containing raw material may be melted, e.g., by heating the iron-containing raw material in a furnace to form molten iron-containing material. The molten iron-containing material then may be flowed over a cold roller surface to quench the molten iron-containing material and form a bulk iron-containing material in a form of ribbon having a polycrystalline microstructure including a plurality of grains forms during the processing on the cold roller surface. In some examples, the cold roller surface may be cooled at a temperature between about 10° C. and about 25° C.

During the cooling on the cold roller surface the polycrystalline microstructure forms and a stored energy may be accumulated in several ways, which increases internal residual stress in the material. The grain boundary area is created and this is done by the incorporation of some of the dislocations that are continuously created during the processing 110. The grains change their shape and there is a large increase in the total grain boundary area. In some examples, some grains may experience deformation which contributes to increase of dislocations and thereby increase of the stored energy in the material.

There may be some contributions of any vacancies and interstitials that may have survived. The sum of the energy of all of the dislocations, new interfaces, and any other defects represents the stored energy of the material. The free energy of the crystalline material is raised during the processing 110 by the presence of dislocations and interfaces, and the material containing these defects becomes thermodynamically unstable.

To reduce the free/stored energy of a material, the material may be annealed. Annealing involves heating the material at an elevated temperature. There are generally two types of annealing processes used to treat the material: recovery annealing and recrystallization annealing. With the recovery annealing, the material is heated to a temperature such that the grain boundaries of the grains are generally maintained, but the dislocations within the grains move to lower energy configurations. These lower energy configurations within the grains are called sub-grains or cells. Thus, the grains produced from the recovery annealing are generally called recovered grains. The recovered grains generally have the substantially same grain boundary configurations as the original grains, but, due to the recovery annealing, there is rearrangement of internal dislocations to a lower energy configuration within the recovered grains. The microstructural changes during recovery are relatively homogeneous and do not usually affect the boundaries between the original grains. Recovery generally involves only a partial restoration of properties because the dislocation structure has not been completely removed, but reached a metastable state.

Figure 2:
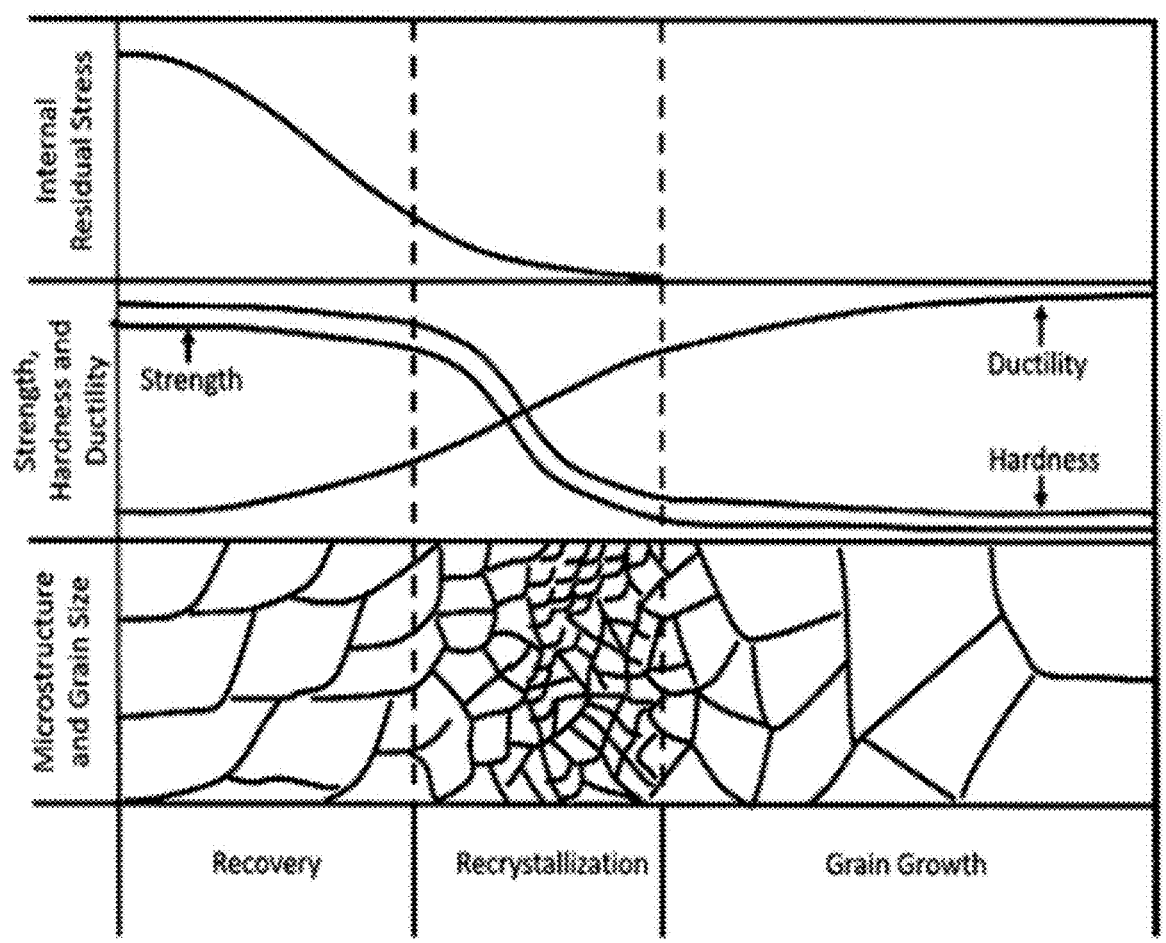
FIG. 2 shows schematic descriptions of a grain structure at different stages with the corresponding properties.

With recrystallization annealing, the material is heated to a temperature that produces new grains from the original, deformed and/or recovered grains by the formation and migration of high angle grain boundaries at a critical temperature. These new grains are called recrystallized grains. FIG. 2 shows schematic descriptions of grain structures at different stages with the corresponding properties.

According to the disclosure, the bulk iron-containing material is annealed at an elevated temperature and subsequently quenched 120. In some examples, the annealing the bulk iron-containing material 120 may be carried out at a temperature high enough for recrystallization. During the annealing 120, recrystallization may occur in which new grains are formed within the original, deformed and/or recovered microstructure. The recrystallization during the annealing 120 relies on relieving the stored energy accumulated by the processing 110. The new grains grow and consume the old grains, resulting in a new grain structure with a low dislocation density. Although recrystallization removes the dislocations, the material still contains grain boundaries as shown in FIG. 2.

The magnitude of the final grain size can be rationalized in terms of the effects of the various parameters of the nucleation and growth processes. Any factor such as a high strain or a small initial grain size, which favors a large number of nuclei or a rapid nucleation rate, may lead to a small final grain size. However, if a change of annealing temperature or heating rate alters the balance between nucleation and growth, then the final grain size may be affected accordingly.

Upon heating 120, when the temperature is high enough, the body-centered cubic (bcc) α-Fe may transform into a face-centered cubic (fcc) γ-Fe which is referred to as austenite at a temperature around about 910° C. or higher, depending on the alloy composition of the bulk iron-containing material. According to the disclosure, the bulk iron-containing material may be annealed at 910° C. or higher. In some examples, the bulk iron-containing material may be annealed at 930° C. or higher. In other examples, the bulk iron-containing material may be annealed at 940° C. or higher.

The grain size refinement can be a combination of recrystallization and austenite phase transformation. Without wishing to be bound by theory, the grains firstly may recover and then the new set of grains may recrystallize at the grain boundary. According to the disclosure, in some examples, an average grain size of the plurality of crystallographic grains after the recrystallization 120 may be about 10 μm or less. In some examples, the average grain size may be about 5 μm or less. In some examples, the average grain size may be about 1 μm or less. In some examples, the average grain size may be in the range of from about 10 nm to about 10 μm. In some examples, the average grain size may be in the range of from about 20 nm to about 10 μm. In some examples, the average grain size may be in the range of from about 50 nm to about 10 μm. In some examples, the average grain size may be about 200 nm or less. In other examples, the average grain size may be about 100 nm or less.

The polycrystalline microstructure includes a plurality of grain boundaries. In some examples, a width of at least one grain boundary may be about 50 nm or less. In some examples, a width of at least one grain boundary may be 20 nm or less. In some examples, a width of at least one grain boundary may be about 5 nm or less. In other examples, a width of at least one grain boundary may be in the range of 2 nm and about 5 nm.

After heating during the annealing 120, the material may be quenched. The quenching 130 is a fast cooling step. In some examples, a cooling rate during the quenching may be about 1000K/sec. or faster. In other examples, a cooling rate during the quenching may be about 5000K/sec. or faster. In some examples, the quenching may be carried out in an atmosphere containing oxygen to produce oxides in the bulk iron-containing material.

In some examples, the bulk iron-containing material may be exposed to reducing species 140. For example, a reducing in hydrogen step 140 may be applied prior to nitriding the bulk iron-containing material 150, which creates microchannels to enhance nitrogen diffusion. The bulk iron-containing material may be exposed to $H_2$ at a temperature in the range of from about 200° C. to about 500° C. for up to about 10 hours. In some examples, the material may be exposed to $H_2$ at a temperature in the range of from about 300° C. to about 500° C.

Nitriding the bulk iron-containing material 150 produces a bulk iron-nitride material with desired phases. In some examples, after the annealing 120, the nitriding 150 may proceed by contacting a nitrogen source with the bulk iron-containing material. Nitriding the bulk iron-containing material 150 includes heating the material to a temperature for a time sufficient to allow diffusion of nitrogen to a predetermined concentration substantially throughout the volume of the bulk iron-containing material. In some examples, a temperature for the nitriding may be at 500° C. or higher. In some examples, a temperature for the nitriding may be at 700° C. or higher. In other examples, a temperature for the nitriding may be at 800° C. or higher.

Lowering the nitriding temperature of bulk iron is also possible when the microstructure is modified, which enhances the chemical reaction kinetics of nitriding. The nitriding temperature of iron processed with grain refinement can be lower than 500° C. The grain refinement helps enhance the chemical reaction kinetics of nitriding at a lower temperature. In some examples, the nitriding temperature of the bulk iron-containing material with grain refinement may be at about 500° C. or lower. In some examples, the nitriding temperature may be at about 200° C. or lower. In other examples, the nitriding temperature may be at about 160° C. or lower. In some examples, the nitriding temperature may be in a range from about 140° C. to about 170° C.

Magnets that include a $Fe_{16}N_2$ phase may provide a relatively high energy product. The energy product of a permanent magnetic is proportional to the product of coercivity and remanent magnetization. A higher energy product can lead to increased efficiency of the permanent magnet when used in motors, generators, or the like.

According to the disclosure, the bulk iron-nitride materials that include a Fei6N2 phase may not require rare earth elements, which may reduce a materials cost of the magnet and may reduce an environmental impact of producing the magnet. In some examples, the bulk iron-nitride materials that include a $Fe_{16}N_2$ phase may not include rare earth elements although some negligible impurities of rare earth elements could be present. Using the techniques 100 described herein may also reduce an environmental impact of the producing bulk permanent magnets compared to processes used to make rare earth magnets.

In general, $Fe_{16}N_2$ is a metastable phase, which competes with other stable phases of Fe—N. Hence, forming a bulk material including a high volume fraction of $Fe_{16}N_2$ is difficult. The bulk magnetic material including a $Fe_{16}N_2$ phase described in this disclosure overcomes this difficulty. According to the disclosure, the $Fe_{16}N_2$ phase may include any of a body centered cubic (bcc) structure, a body centered tetragonal (bct) structure and a martensite structure. In some examples, after the nitriding 150, resulting phase constitutions may include iron-nitride phases such as $\alpha'$—$Fe_8N$, $\alpha''$—$Fe_{16}N_2$, and a body centered tetragonal (bct) phase including Fe and N. The $\alpha'$—$Fe_8N$ is the chemically disordered counterpart of chemically-ordered $\alpha''$—$Fe_{16}N_2$ phase. The $\alpha''$—$Fe_{16}N_2$ phase may have a body centered tetragonal (bct) crystal structure, and can introduce a relatively high magnetocrystalline anisotropy.

In some examples, in the bulk iron-nitride material, a phase ratio between phases containing $Fe_{16}N_2$ phases and Fe phases not containing $Fe_{16}N_2$ phases, for example, $Fe_{16}N_2$ (202)/(non-$Fe_{16}N_2$)Fe(110), may be about 1.0 or higher. In some examples, the phase ratio may be about 1.3 or higher. In other examples, the phase ratio may be about 2 or higher. A phase ratio is a relative ratio of intensities in X-Ray Diffraction (XRD) patterns. For example, a peak intensity ratio of (202) of $Fe_{16}N_2$/(110) of (non-$Fe_{16}N_2$) Fe is measured with a peak intensity of (202) of $Fe_{16}N_2$ at 42.7° in 2θ and a peak intensity of (110) of (non-$Fe_{16}N_2$) Fe at 44.7° in 2θ in Cu-Kα XRD patterns.

After the nitriding 150, in some examples, the bulk iron-nitride material may include pores. Without wishing to be bound by theory, pores may enhance the nitriding process by increasing the surface to volume ratio for nitriding and providing high diffusivity path of nitrogen atom diffuse along the pores regarded as "micro or nano-channel". Since the diffusivity of solute element at grain boundary is usually larger than the diffusivity of solute element in the grain, the nitrogen atom, which is absorbed by iron ribbon, can diffuse more easily follow micro channel provided by the vacancies or pores. The volume of pores may be controlled by at least some combination of recrystallization 120, oxidation 130, and reduction in hydrogen 140. In some examples, a volume of the pores in the bulk iron-nitride material may be about 1% or higher. In some examples, a volume of the pores in the bulk iron-nitride material may be about 5% or higher. In other examples, a volume of the pores in the bulk iron-nitride material may be about 10% or higher. In some examples, a volume of the pores in the bulk iron-nitride material may be about 30% or higher. In another example, a volume of the pores in the bulk iron-nitride material may be about 50% or higher. In some examples, pores may be present throughout the volume of the material. In other examples, some of the pores may be present on at least a surface of one or more grains.

In another example, further heat treatment processes in order to introduce alloy elements which can fill up the pores can be used to improve corresponded mechanical or magnetic properties. Mn or Cr could be a good candidate as a solute alloy element to form anti-magnetic phase to isolate hard magnetic $Fe_{16}N_2$ particles.

A relatively low coercivity may be due to the exchange coupling between magnetic hard phase $\alpha''$—$Fe_{16}N_2$ with magnetic soft phase residual Fe. The soft magnetic phase may include any of Fe, $Fe_8N$, $Fe_4N$ and $Fe_3N$. The coercivity increases with the increase of $Fe_{16}N_2$ phase ratio. According to the disclosure, a coercivity of the bulk iron-nitride material is about 600 Oe or higher. In some examples, the coercivity may be about 1000 Oe or higher. In some examples, the coercivity may be about 3000 Oe or higher. In some examples, the coercivity may be about 5000 Oe or higher. In other examples, the coercivity may be about 8000 Oe or higher.

Higher coercivity is achieved when an external magnetic field applied along the easy axis of a sample. In some examples, the magnetic easy axis of the iron-nitride material may be in a range of from about 40 to about 70 degrees from an in-plane sample axis toward an out-of-plane direction. In some examples, the magnetic easy axis of the iron-nitride material may be about 60 degrees. In some examples, the maximum Hc may equal or be larger than the coercivity at 60 degrees.

In addition to the coercivity, a relatively low saturation magnetization ($M_s$) may be caused by the sample oxidation and retain γ-Fe. The saturation magnetization increases with the reduction of oxidation and retain γ-Fe. According to the disclosure, a saturation magnetization of the bulk iron-nitride material is about 130 emu/g or higher. In some examples, the saturation magnetization may be about 140 emu/g or higher. In other examples, the saturation magnetization may be about 200 emu/g or higher.

INDUSTRIAL APPLICABILITY

The disclosure may be applicable to iron-containing materials to produce bulk iron rich permanent magnets. The ram material includes iron. In some examples, the raw material may include one or more non-magnetic elements such as Al, Cu, Ti, W, Mn, Cr, Zr, Ta, Nb, B, C, Ni, Ru, $SiO_2$, $Al_2O_3$, $Ta_{(x)}O_{(y)}$, CrO, $Cr_2O_3$, $TiO_2$, BN, $Si_{(x)}N_{(y)}$, $AL_{(x)}N_{(y)}$, $Cr_xN_y$, $Mn_xN_y$ or combinations thereof, wherein each of x and y is larger than 0 and less than 1. The non-magnetic elements may be present at the grain boundaries to control formation of over-nitrided phases such as $Fe_3N$ and $Fe_4N$. In some examples, the raw material may include Cu and/or B.

The raw material may be processed by various methods to form a bulk shape. For example, the raw material may be further processed to form a strip, a ribbon, a foil, a sheet, foam or a plate 110. The raw material may be processed with fast belt casting. In some examples, an iron-containing ribbon may be prepared with a melt spinning technique. In melting spinning, an iron precursor or iron-containing raw material may be melted, e.g., by heating the iron-containing raw material in a furnace to form molten iron-containing material. The molten iron-containing material then may be flowed over a cold roller surface to quench the molten iron-containing material and form a ribbon of material. A thickness of the bulk iron-containing material may be adjusted. In some examples, the thickness may be 0.1 μm or larger. In another example, the thickness may be in a range of 0.1 μm and 1 mm. In another example, the thickness may be about 200 μm or less. In other examples, the thickness may be about 100 μm or less.

In some examples, long and wide ribbons of iron-containing material may be obtained through planar flow melt spinning (PFMS) process. The process involves induction melting of iron-containing material in a crucible followed by ejection through a nozzle onto a rotating wheel. Once the material melts, the crucible is brought down close to the rotating wheel and the melt is ejected using a positive pressure of inert gas to form the long and wide ribbons.

In other examples, an iron-containing material may be processed with continuous casting. A molten iron mixture flows out of an ingot chamber through a nozzle to form an iron-containing ribbon, foil, sheet or plate. The iron-containing material is fed into a gap zone between rollers, which are rotated in opposite directions. The rotation speed of the rollers may vary, and the rollers with respect to each other may rotate at the same rate. The rollers may be actively cooled with a cooling medium, e.g., using water cooling, which maintains the surfaces of rollers at a temperature below the temperature of the iron-containing material and aids in cooling and casting the iron-containing material.

A porous structure obtained by oxidation and reduction process is utilized to improve the nitride case depth and enlarge the diffusion zone of nitriding. In some examples, the porous structure can be processed by powder metallurgy, iron/iron oxide composite, and/or iron foam prepared by electro-deposition/hydrogen reduction method.

The bulk iron-containing material may be annealed at about 910° C. or higher to recrystallize the material 120. The grain size may be controlled by a combination of the annealing temperature and time for the austenite transformation during the annealing 120. In some examples, the bulk iron-containing material may be annealed at about 930° C. or higher. In other examples, the bulk iron-containing material may be annealed at about 940° C. or higher. The annealing may be carried out in a furnace for a certain amount of time to obtain a recrystallized microstructure 120. In some examples, the annealing time may be about 1 hour or less. In some examples, the annealing time may be about 30 minutes or less. In other examples, the annealing time may be about 20 minutes or less. In another example, the annealing time may be in the range of between about 8 minutes and 16 minutes. Subsequently, the recrystallized bulk iron-containing material may be quenched in a medium containing oxygen. In some examples, the recrystallized bulk iron-containing material may be quenched in water or the like. In some examples, the recrystallized bulk iron-containing material may be quenched to a temperature to about 25° C. or lower. In other examples, the recrystallized bulk iron-containing material may be quenched to a temperature to about 5° C. or lower.

The recrystallized bulk iron-containing material may be exposed to reducing species 140. For example, a reducing in hydrogen step 140 may be applied prior to nitriding the recrystallized bulk iron-containing material 150. In some examples, the recrystallized bulk iron-containing material may be exposed to $H_2$ at a temperature in the range of from about 200° C. to about 500° C. for up to about 10 hours. In some examples, the material may be exposed to $H_2$ at a temperature in the range of from about 300° C. to about 500° C. A flow rate of hydrogen during the reduction 140 may be about 20 standard cubic centimeters per minute (sccm) or higher. In some examples, a flow rate of nitrogen source may be about 30 sccm or higher. In other examples, a flow rate of nitrogen source may be about 40 sccm or higher. In another example, a hydrogen flow rate may be in the range of from about 40 sccm to about 80 sccm.

Nitriding the recrystallized bulk iron-containing material 150 includes exposing the material to a nitrogen substance. In some examples, nitriding the recrystallized bulk iron-containing material 150 may include heating the material to a temperature for a time sufficient to allow diffusion of nitrogen to a predetermined concentration substantially throughout the volume of the recrystallized bulk iron-containing material. Without wishing to be bound by theory, the grain refinement may help enhance the chemical reaction kinetics of nitriding at a low temperature where $\alpha''-Fe_{16}N_2$ phase is directly formed after such low temperature nitriding.

In some examples, the duration of nitriding may be about 10 minutes or more. In some examples, the duration of nitriding may be about 1 hour or more. In some examples, the nitriding may continue for between about 20 hours and about 100 hours.

The nitrogen may be supplied in a gas phase alone (e.g., substantially pure ammonia or diatomic nitrogen gas) or as a mixture with a carrier gas. Nitrogen may diffuse into the recrystallized material from the nitrogen gas or gas mixture including Ar and/or hydrogen carrier gas. A flow rate of nitrogen source during the nitriding 150 may be about 30 standard cubic centimeters per minute (sccm) or higher. In some examples, a flow rate of nitrogen source may be about 40 standard cubic centimeters per minute (sccm) or higher. In some examples, the nitrogen may be provided from another nitrogen precursor, such as ammonia ($NH_3$), an amine, or ammonium nitrate ($NH_4NO_3$). In another example, the nitrogen may be provided from urea ($CO(NH_2)_2$).

In some examples, the nitriding 150 may be performed in a furnace with at least two temperature zones, high temperature zone and low temperature zone. The high temperature zone helps to decompose the ammonia source. In some examples, the high temperature zone may be operated at a temperature of about 500° C. or below. In some examples, the high temperature zone may be operated at a temperature in the range of from about 200° C. to about 300° C. The low temperature zone controls the formation of $\alpha''-Fe_{16}N_2$ phase. In some examples, the low temperature zone may be operated at a temperature of about 200° C. or below. In other examples, the low temperature zone may be operated at a temperature in the range of from about 140° C. to about 170° C. A rotary furnace may be used to homogeneously nitride the material.

Nitriding the recrystallized bulk iron-containing material 150 promotes the formation of iron-nitride phases including an $\alpha''-Fe_{16}N_2$ phase. The magnetic $Fe_{16}N_2$ phase may include any of a body centered cubic (bcc) structure, a body centered tetragonal (bct) structure and a martensite structure. In some cases, the recrystallized bulk iron-containing material may be quenched for martensite phase transformation and post-annealing for formation of $Fe_{16}N_2$ phase.

In one embodiment, stress annealing 160 by straining and annealing the nitrided material may be carried out. Straining the nitrided material 160 may form a textured microstructure. In some examples, straining 160 may include applying a suitable tensile force to opposing ends of the nitrided material. Further, in some examples, straining the nitrided material 160 may include applying a compressive force to the nitrided material along at least one axis orthogonal to the axis of the applied tensile force. In some examples, straining the nitrided material 160 may also include straining the iron-nitride-containing material in a direction substantially parallel to respective <001> crystal axes of the plurality of grains within the ribbon.

The amount of strain may vary depending on the desired elongation to control the likelihood that some or all iron-nitride grains may have a similar crystal orientation. In some examples, the strain may be between about 0.3% and about 7%. In other examples, the strain may be less than 0.3%. In several examples, the strain may be larger than 7%.

In another embodiment, the nitrided material may be annealed under a magnetic field 170. In some examples, the stress annealed material may be annealed under a magnetic field 170. A magnetic field may be applied to the material to align or substantially align with a magnetic field direction. Thus, the applied field may increase the likelihood that some or all iron-nitride grains may have a similar crystal orientation. A material with multiple iron-nitride crystals with a substantially similar crystal orientation or a preferred crystal orientation may increase magnetic anisotropy of the material. In some examples, the applied magnetic field may be in the range of from 5 T to about 20 T at an elevated temperature higher than room temperature. In other examples, the applied magnetic field may be in the range of from 10 T to about 18 T. The elevated temperature may be in the range of about 100° C. to about 200° C. In some examples, the elevated temperature may be in the range of about 160° C. to about 180° C.

The bulk iron-nitride material in accordance of the disclosure may be in any form. In some examples, the bulk iron-nitride material may in a form of any of strip, ribbon, foil, sheet, foam and plate. In some examples, the bulk iron-nitride material may be a single layer of strip, ribbon, foil, sheet, or plate. In other examples, the bulk iron-nitride material may be in a form of stack having a plurality of layers of ribbon, foil, sheet, foam or plate. One or more dimensions of the bulk iron-nitride material may be about 1 µm or more. In some examples, one or more dimensions may be about 10 µm or more. In other examples, one or more dimensions may be about 0.1 mm or more. In other examples, one or more dimensions may be about 1 mm or more. In some examples, a dimension in each of three orthogonal sample axes may be about 1 µm or more. In some examples, a dimension in each of three orthogonal sample axes may be about 10 µm or more. In some examples, a dimension in each of three orthogonal sample axes may be about 0.1 mm or more. In some examples, a dimension in each of three orthogonal sample axes may be about 1 mm or more.

Clause 1: A bulk iron-nitride material having a polycrystalline microstructure comprising a plurality of crystallographic grains surrounded by grain boundaries, wherein at least one crystallographic grain comprises an iron-nitride phase comprising any of a body centered cubic (bcc) structure, a body centered tetragonal (bct) structure and a martensite structure, where the microstructure comprises pores.

Clause 2: The bulk iron-nitride material of Clause 1, wherein a raw iron-containing material used to obtain the bulk iron-nitride material has a porous structure in a form of any of foil, ribbon, sheet, foam, and a composite bulk.

Clause 3: The bulk iron-nitride material of Clause 1, wherein at least one of the crystallographic grains are recrystallized.

Clause 4: The bulk iron-nitride material of Clause 1, wherein an average grain size of the plurality of crystallographic grains is about 10 µm or less.

Clause 5: The bulk iron-nitride material of Clause 1, wherein an average grain size of the plurality of crystallographic grains is about 5 µm or less.

Clause 6: The bulk iron-nitride material of Clause 1, wherein an average grain size of the plurality of crystallographic grains is about 1 µm or less.

Clause 7: The bulk iron-nitride material of Clause 1, wherein an average grain size of the plurality of crystallographic grains is in a range of from about 10 nm to about 10 µm.

Clause 8: The bulk iron-nitride material of Clause 1, wherein an average grain size of the plurality of crystallographic grains is in a range of from about 200 nm to about 1 µm.

Clause 9: The bulk iron-nitride material of Clause 1, wherein an average grain size of the plurality of crystallographic grains is in a range of from about 10 nm to about 200 nm.

Clause 10: The bulk iron-nitride material of Clause 1, wherein a width of at least one grain boundary is 50 nm or less.

Clause 11: The bulk iron-nitride material of Clause 1, wherein a width of at least one grain boundary is 20 nm or less.

Clause 12: The bulk iron-nitride material of Clause 1, wherein a width of at least one grain boundary is 5 nm or less.

Clause 13: The bulk iron-nitride material of Clause 1, wherein at least one grain boundary comprises a non-magnetic element selected from the group consisting of Al, Cu, Ti, Mn, Cr, Zr, Ta, Nb, B, C, Ni, Ru, $SiO_2$, $Al_2O_3$, $Ta_{(x)}O_{(y)}$, CrO, $Cr_2O_3$, $TiO_2$, BN, $Si_{(x)}N_{(y)}$, $AL_{(x)}N_{(y)}$, $Cr_xN_y$, $Mn_xN_y$, or combinations thereof, wherein each of x and y is larger than 0 and less than 1.

Clause 14: The bulk iron-nitride material of Clause 1, wherein one or more dimensions of the material is 1 µm or more.

Clause 15: The bulk iron-nitride material of Clause 1, wherein one or more dimensions of the material is 10 µm or more.

Clause 16: The bulk iron-nitride material of Clause 1, wherein one or more dimensions of the material is 0.1 mm or more.

Clause 17: The bulk iron-nitride material of Clause 1, wherein one or more dimensions of the material is 1 mm or more.

Clause 18: The bulk iron-nitride material of Clause 1, wherein the polycrystalline microstructure comprises at least one crystallographic grain having a face-centered cubic structure of Fe.

Clause 19: The bulk iron-nitride material of Clause 1, wherein the iron-nitride phase comprises an $\alpha"$—$Fe_{16}N_2$ phase.

Clause 20: The bulk iron-nitride material of Clause 19, wherein the $\alpha"$—$Fe_{16}N_2$ phase comprises any of a body centered tetragonal (bct) and a martensite structure.

Clause 21: The bulk iron-nitride material of Clause 19, wherein a phase ratio of $Fe_{16}N_2$/(non-$Fe_{16}N_2$) Fe phases is 1.0 or higher.

Clause 22: The bulk iron-nitride material of Clause 19, wherein a phase ratio of $Fe_{16}N_2$/(non-$Fe_{16}N_2$) Fe phases is 1.3 or higher.

Clause 23: The bulk iron-nitride material of Clause 19, wherein a phase ratio of $Fe_{16}N_2$/(non-$Fe_{16}N_2$) Fe phases is 2 or higher.

Clause 24: The bulk iron-nitride material of Clause I, wherein the bulk iron-nitride material comprises a soft magnetic phase comprising any of Fe, $Fe_8N$, $Fe_4N$ and $Fe_3N$.

Clause 25: The bulk iron-nitride material of Clause 1, wherein a saturation magnetization of the iron-nitride material is 130 emu/g or higher.

Clause 26: The bulk iron-nitride material of Clause 1, wherein a saturation magnetization of the iron-nitride material is 140 emu/g or higher.

Clause 27: The bulk iron-nitride material of Clause 1, wherein a coercivity of the material is 600 Oe or higher.

Clause 28: The bulk iron-nitride material of Clause 1, wherein a coercivity of the material is 1000 Oe or higher.

Clause 29: The bulk iron-nitride material of Clause 1, wherein a coercivity of the material is 3000 Oe or higher.

Clause 30: The bulk iron-nitride material of Clause 1, wherein a coercivity of the material is 5000 Oe or higher.

Clause 31: The bulk iron-nitride material of Clause 1, wherein a coercivity of the material is 8000 Oe or higher.

Clause 32: The bulk iron-nitride material of Clause 1, wherein a volume of pores in the bulk iron-nitride material is 1% or higher.

Clause 33: The bulk iron-nitride material of Clause 1, wherein a volume of pores in the bulk iron-nitride material is 10% or higher.

Clause 34: The bulk iron-nitride material of Clause 1, wherein a volume of pores in the bulk iron-nitride material is 50% or higher.

Clause 35: The bulk iron-nitride material of Clause 1, wherein a maximum coercivity may equal or be larger than a coercivity at 60 degrees from an in-plane direction.

Clause 36: A method of producing a bulk iron-nitride material having a polycrystalline microstructure, comprising: melting an iron source to obtain a molten iron source; fast belt casting the molten iron source to obtain a cast iron source; cooling and shaping the cast iron source to obtain a bulk iron-containing material having a body-centered cubic (bcc) structure; annealing the bulk iron-containing material at an austenite transformation temperature and subsequently cooling the bulk iron-containing material; and nitriding the bulk iron-containing, material to obtain the bulk iron-nitride material.

Clause 37: The method of Clause 36, wherein the iron source comprises Fe.

Clause 38: The method of Clause 36, wherein the iron source further comprises a non-magnetic element.

Clause 39: The method of Clause 38, wherein at least one grain boundary comprises a non-magnetic element selected from the group consisting of Al, Cu, W, Ti, Mn, Cr, Zr, Ta, Nb, B, C, Ni, Ru, $SiO_2$, $Al_2O_3$, $Ta_{(x)}O_{(y)}$, CrO, $Cr_2O_3$, $TiO_2$, BN, $Si_{(x)}N_{(y)}$, $AL_{(x)}N_{(y)}$, $Cr_xN_y$, $Mn_xN_y$ or combinations thereof, wherein each of x and y is larger than 0 and less than 1.

Clause 40: The method of Clause 36, wherein the austenite transformation temperature is at 910° C. or higher.

Clause 41: The method of Clause 36, wherein the austenite transformation temperature is at 930° C. or higher.

Clause 42: The method of Clause 36, wherein the annealing is carried out in a furnace for about 30 minutes or less.

Clause 43: The method of Clause 36, wherein the annealing is carried out in a furnace in a range of about 8 minutes and 16 minutes.

Clause 44: The method of Clause 36, further comprising reducing the bulk iron-containing material in a hydrogen environment.

Clause 45: The method of Clause 44, wherein a temperature for the reduction is at 300° C. or higher.

Clause 46: The method of Clause 44, wherein a flow rate of hydrogen source during the reduction is 30 standard cubic centimeters per minute (sccm) or higher.

Clause 47: The method of Clause 44, wherein a flow rate of hydrogen source during the reduction is 40 standard cubic centimeters per minute (sccm) or higher.

Clause 48: The method of Clause 36, wherein a temperature for the nitriding is at 200° C. or lower.

Clause 49: The method of Clause 36, wherein a temperature for the nitriding is at 160° C. or lower.

Clause 50: The method of Clause 36, wherein a cooling rate during the cooling of the cast iron source is 1000 K/sec or faster.

Clause 51: The method of Clause 36, wherein a cooling rate during the cooling of the cast iron source is 5000 K/sec or faster.

Clause 52: The method of Clause 36, wherein a cooling rate for cooling the annealed bulk iron-containing material is 1000 K/sec or faster.

Clause 53: The method of Clause 36, wherein a cooling rate for cooling the annealed bulk iron-containing material is 5000 K/sec or faster.

Clause 54: The method of Clause 36, wherein a flow rate of nitrogen source during the nitriding is 30 standard cubic centimeters per minute (sccm) or higher.

Clause 55: The method of Clause 36, wherein a flow rate of nitrogen source during the nitriding is 40 standard cubic centimeters per minute (sccm) or higher.

Clause 56: The method of Clause 36, wherein a duration time of the nitriding is about 1 hour or more.

Clause 57: The method of Clause 36, wherein a duration time of the nitriding is in a range of from about 20 hours to about 100 hours.

Clause 58: The method of Clause 36, further comprising: quenching and thereby oxidizing the annealed bulk iron-containing material in an atmosphere containing oxygen.

Clause 59: The method of Clause 36, wherein a temperature for the nitriding is at 500° C. or higher.

Clause 60: The method of Clause 36, wherein a temperature for the nitriding is at 700° C. or higher.

Clause 61: The method of Clause 36, wherein a temperature for the nitriding is at 800° C. or higher.

Clause 62: The method of Clause 36, further comprising: quenching for martensite phase transformation and post-annealing for formation of $Fe_{16}N_2$ phase.

Clause 63: A method of producing a bulk iron-nitride material having a polycrystalline microstructure, comprising: preparing a bulk iron-containing material having a porous structure; annealing the bulk iron-containing material; and subsequently cooling the bulk iron-containing material; and nitriding the bulk iron-containing material to obtain the bulk iron-nitride material.

EXAMPLES

Ribbons of Fe with 3 wt. % Cu and 2 wt. % B were prepared by a melt spinning system. An average thickness of the ribbons was 20 µm. First, a box furnace was heated up to 930° C. The Fe ribbons were put in the furnace for between 8 and 16 minutes and then were quenched to room temperature in distilled water. Subsequently, the Fe ribbons were placed in a tube furnace at 350° C. for 2 h at different hydrogen flow rates between 40 and 80 sccm. After that, the nitriding process was processed with the Fe ribbons in the same furnace at different temperatures, 140, 160 and 180° C. Different ammonia flow rates were applied between 40 and 80 sccm. Different duration times for the nitriding were also applied.

The composition information of ribbon samples was observed with SEM (Scanning Electron Microscopy) energy dispersive X-ray spectroscopy (EDX). The crystalline structures were examined by X-ray diffraction (XRD, Bruker 2D Discover D8). The XRD patterns were obtained with Cu-Kα radiation. The magnetic properties were measured using a physical properties measurement system (PPMS) integrated with a vibrating sample magnetometer (Quantum Design).

Figure 3A:
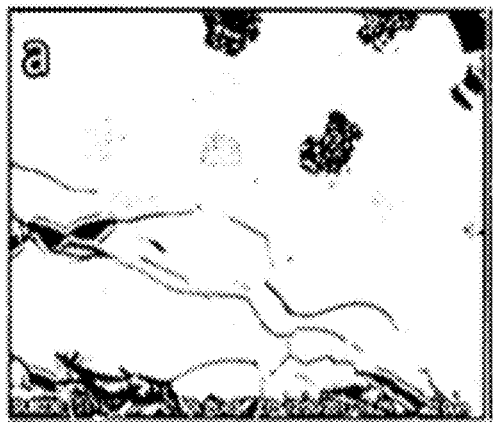
FIG. 3(a) shows a micrograph of an exemplary sample quenched after recrystallization at 930° C.
Figure 3B:
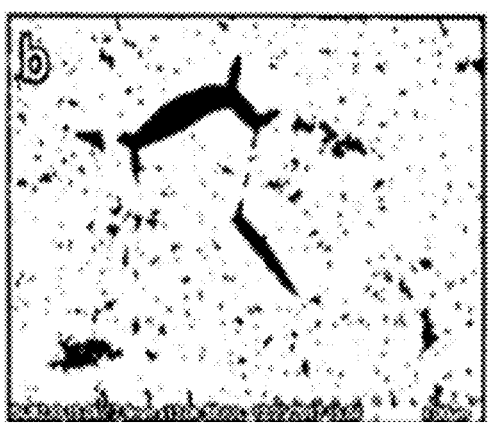
FIG. 3(b) shows a microstructure after reducing in hydrogen at 350° C. with 40 sccm hydrogen for 2 h.
Figure 3C:
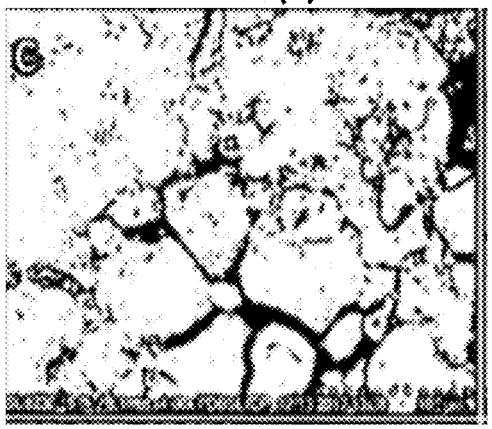
Figure 3D:
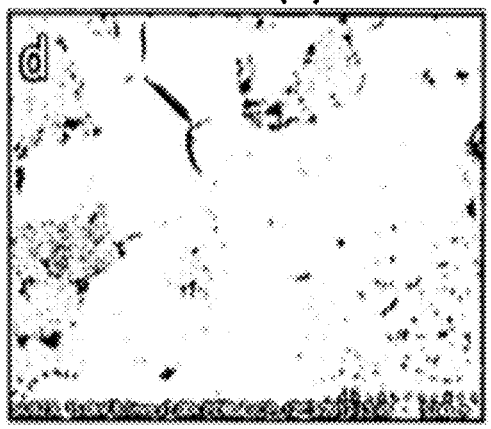
Figure 3E:
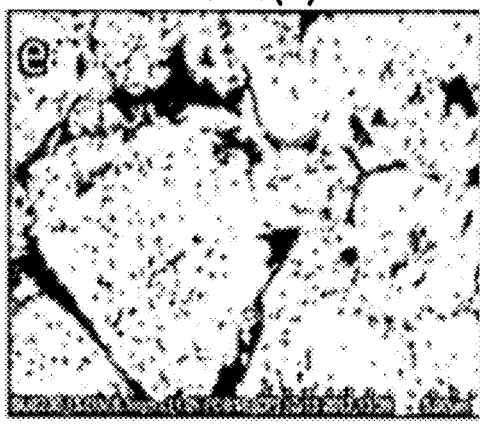
Figure 3F:
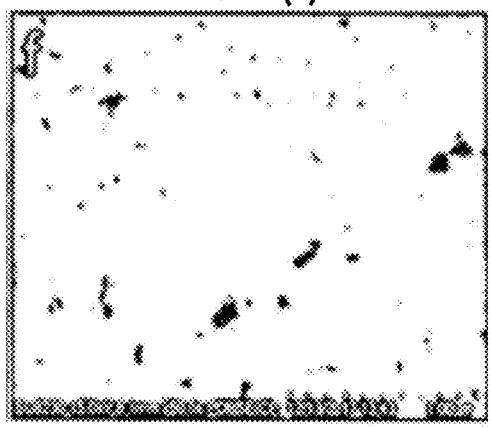

FIGS. 3(a)-(f) show the microstructural changes of the ribbon samples observed in the SEM images. The morphologies of the ribbon samples were characterized using a field-emission electron microscopy (FE SEM, Hitachi S-5000). FIG. 3(a) shows a micrograph of a ribbon sample annealed at 930° C. and quenched therefrom. A polycrystalline microstructure with a plurality of recrystallized grains was obtained. The microstructure was fully recrystallized. FIG. 3(b) shows a microstructure after the reduction at 350° C. with 40 sccm hydrogen for 2 hours, which shows pores. FIG. 3(c)-(f) show micrographs taken at various magnifications after the nitriding at 160° C. with 80 sccm ammonia.

FIG. 4 shows SEM images at different magnifications (a), (b) showing a porous structure of the bulk iron-nitride after the nitriding. A volume of pores in the bulk iron-nitride material was about 58%. The pores are present throughout the volume of the sample. Additionally, some of the pores are present on the surfaces of grains, which result in porous surfaces of the grains.

FIG. 5 shows XRD patterns of (a) a raw ribbon; (b) a ribbon after quenching from recrystallization at 930° C.; (c) a ribbon after reduction in hydrogen. FIG. 5(a) confirms formation of body centered cubic (bcc) Fe. However, after the quenching, oxides have formed as shown in FIG. 5(b). FIG. 5(c) indicates that the oxides were substantially reduced after the reduction in hydrogen.

FIG. 6 shows XRD patterns of ribbons with different nitriding conditions: (a) 160° C. with 80 sccm ammonia for 42 h; (b) 160° C. with 80 sccm ammonia for 63 h; (c) 160° C. with 80 sccm ammonia for 84 h. An $\alpha''$—$Fe_{16}N_2$ phase was successfully fabricated during the low temperature nitriding. A phase ratio of $\alpha''$—$Fe_{16}N_2$ could be controlled by temperature and ammonia gas flow rate. A $Fe_3N$ phase was observed when the sample was over-nitrided, which could be reduced by modifying the nitriding parameters.

FIG. 7 shows XRD patterns of an exemplary ribbon according to the disclosure. The peak intensity of (202) of $Fe_{16}N_2$ at 42.7° in 2θ was 459 whereas the peak intensity of (110) of (non-$Fe_{16}N_2$) Fe at 44.7° in 2θ was 447. Based on the results, a relative phase ratio of 1.03 of $Fe_{16}N_2$/(non-$Fe_{16}N_2$)Fe phases was obtained.

FIG. 8 shows coercivity as a function of relative $Fe_{16}N_2$ phase ratio (peak intensity ratio of $Fe_{16}N_2$ (202)/bcc Fe(110)). Without wishing to be bound by theory, a relative low coercivity is likely due to the exchange coupling between magnetic hard phase $\alpha''$—$Fe_{16}N_2$ with magnetic soft phase residual bcc Fe and $Fe_3N$. A relatively low $M_s$ is also likely due to sample oxidation and retain γ-Fe. However, the coercivity increased with the increase of $Fe_{16}N_2$ phase ratio. The straight line is the linear fitting result.

FIG. 9 shows hysteresis loops of a sample with a relative peak ratio of $Fe_{16}N_2$ of about 1.3 shown in FIG. 7. The saturated magnetization was about 133 emu/g. The hysteresis loops indicate that the coercivity increased due to the high $Fe_{16}N_2$ ratio where no over-nitrided phase was present. IP stands for in-plane, where the direction of applied magnetic field is along the longitudinal direction of a ribbon sample. OP stands for out-of-plane, where the direction of applied magnetic field is along the perpendicular direction of a ribbon sample, as shown in the insert.

FIG. 10 shows that the coercivity of the nitrided sample depends on the orientation of the sample. Higher coercivity is achieved when an external magnetic field applied along the easy axis of a sample. The magnetic easy axis of the nitrided sample is around 60 degrees. The maximum He of this sample is equal or larger than the coercivity at 60 degrees.

FIG. 11 shows (a) high resolution transmission electron microscope image of nitride ribbon sample, and (b) diffraction patterns of a region in the white box of (a). The patterns matches with $Fe_{16}N_2$ diffraction pattern with zone axis.

Various examples have been described. These and other examples fall within the scope of the following Claims.

The invention claimed is:

1. A bulk iron-nitride material having a polycrystalline microstructure comprising:
   a plurality of crystallographic grains surrounded by grain boundaries, wherein at least one crystallographic grain comprises an iron-nitride phase comprising a body centered tetragonal (bct) structure, wherein the microstructure comprises pores,
   wherein the crystallographic grains exhibit magnetocrystalline anisotropy; and wherein the iron-nitride phase comprises an $\alpha''$-$Fe_{16}N_2$ phase.

2. The bulk iron-nitride material of claim 1, wherein the crystallographic grains have substantially similar crystal orientation.

3. The bulk iron-nitride material of claim 1, wherein an iron-containing material used to obtain the bulk iron-nitride material is in the form of any of a foil, ribbon, sheet, foam, or composite bulk.

4. The bulk iron-nitride material of claim 1, wherein at least one of the crystallographic grains is recrystallized.

5. The bulk iron-nitride material of claim 1, wherein an average grain size of the plurality of crystallographic grains is in a range of from about 200 nm to about 1 μm.

6. The bulk iron-nitride material of claim 1, wherein an average grain size of the plurality of crystallographic grains is in a range of from about 10 nm to about 200 nm.

7. The bulk iron-nitride material of claim 1, wherein a width of at least one grain boundary is 20 nm or less.

8. The bulk iron-nitride material of claim 1, wherein a width of at least one grain boundary is 5 nm or less.

9. The bulk iron-nitride material of claim 1, wherein at least one grain boundary comprises a non-magnetic element selected from the group consisting of Al, Cu, Ti, W, Mn, Cr, Zr, Ta, Nb, B, C, Ni, Ru, $SiO_2$, $Al_2O_3$, $Ta_{(x)}O_{(y)}$, CrO, $Cr_2O_3$, $TiO_2$, BN, $Si_{(x)}N_{(y)}$, $Al_{(x)}N_{(y)}$, $Cr_xN_y$, $Mn_xN_y$, or combinations thereof, wherein each of x and y is larger than 0 and less than 1.

10. The bulk iron-nitride material of claim 1, wherein one or more dimensions of the bulk iron-nitride material are 1 μm or more.

11. The bulk iron-nitride material of claim 1, wherein one or more dimensions of the bulk iron-nitride material are 10 μm or more.

12. The bulk iron-nitride material of claim 1, wherein one or more dimensions of the bulk iron-nitride material are 0.1 mm or more.

13. The bulk iron-nitride material of claim 1, wherein one or more dimensions of the bulk iron-nitride material are 1 mm or more.

14. The bulk iron-nitride material of claim 1, wherein a phase ratio of $Fe_{16}N_2$/(non-$Fe_{16}N_2$) of the Fe phases in the grains is 1.0 or higher.

15. The bulk iron-nitride material of claim 1, wherein a phase ratio of $Fe_{16}N_2$/(non-$Fe_{16}N_2$) Fe phases in the grains is 1.3 or higher.

16. The bulk iron-nitride material of claim 1, wherein a phase ratio of $Fe_{16}N_2$/(non-$Fe_{16}N_2$) Fe phases in the grains is 2 or higher.

17. The bulk iron-nitride material of claim 1, wherein a saturation magnetization of the bulk iron-nitride material is 140 emu/g or higher.

18. The bulk iron-nitride material of claim 1, wherein a coercivity of the bulk iron-nitride material is 600 Oe or higher.

19. The bulk iron-nitride material of claim 1, wherein a coercivity of the bulk iron-nitride material is 1000 Oe or higher.

20. The bulk iron-nitride material of claim 1, wherein a coercivity of the bulk iron-nitride material is 3000 Oe or higher.

21. The bulk iron-nitride material of claim 1, wherein a coercivity of the bulk iron-nitride material is 5000 Oe or higher.

22. The bulk iron-nitride material of claim 1, wherein a volume of pores in the bulk iron-nitride material is 1% or higher.

23. The bulk iron-nitride material of claim 1, wherein a volume of pores in the bulk iron-nitride material is 10% or higher.

24. The bulk iron-nitride material of claim 1, wherein a volume of pores in the bulk iron-nitride material is 50% or higher.

* * * * *